(No Model.)
N. P. STEVENS.
PLUG AND SOCKET CUTTER AND CHUCK FOR THE SAME.
No. 447,048. Patented Feb. 24, 1891.
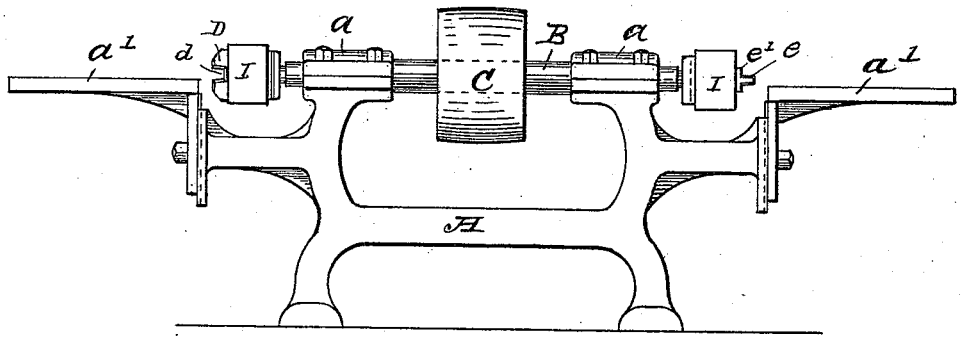
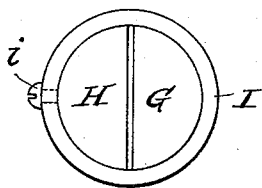
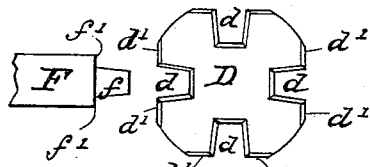
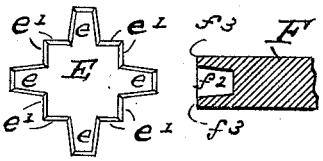
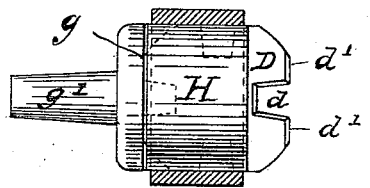
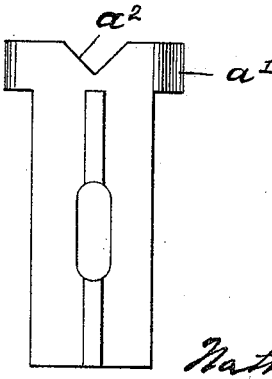
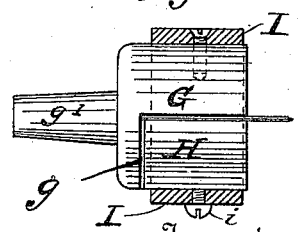
Witnesses
F. E. Sampson
G. H. Sanborn
Inventor
Nathan P. Stevens
By his Attorney J. B. Thurston

UNITED STATES PATENT OFFICE.

NATHAN P. STEVENS, OF CONCORD, NEW HAMPSHIRE.

PLUG AND SOCKET CUTTER AND CHUCK FOR THE SAME.

SPECIFICATION forming part of Letters Patent No. 447,048, dated February 24, 1891.

Application filed September 22, 1890. Serial No. 365,752. (No model.)

*To all whom it may concern:*

Be it known that I, NATHAN P. STEVENS, a citizen of the United States, residing at Concord, in the county of Merrimac and State of New Hampshire, have invented certain new and useful Improvements in Plug and Socket Cutters and Chucks for Same, of which the following is a specification.

My invention relates to plug and socket cutters and a chuck for centering and holding the same upon a lathe spindle.

My object is to provide a cutter for use upon very hard materials—such, for instance, as carbons—and to make them so cheaply that the cutters may be discarded after becoming dulled and replaced by new ones.

The invention consists in two or more cutters (male and female) stamped by a suitable die from sheet-steel, and a suitable chuck, in which the same may be clamped and centered upon a lathe, all of which will be fully set forth in the following specification and claims, and clearly illustrated in the accompanying drawings, forming a part of same, of which—

Figure 1 represents a double-ended lathe provided with guide-rests for the work and one of my improved chucks at each end, each carrying one of my improved cutters. Fig. 2 is an elevation of one of my improved female cutters, and Fig. 3 is a similar view of one of the male cutters. Fig. 4 is an end view of one of the adjustable guides, which attaches to either end of the lathe. Fig. 5 represents the chuck in end elevation. Figs. 6 and 7 are each a sectional elevation of the chuck in different positions.

Corresponding letters designate similar parts throughout the various views.

A represents a lathe having a single spindle B, mounted in two bearings $a\ a$ and carrying between said bearings a driving-pulley C. At each end of the lathe a vertically-adjustable centering-rest $a'$ is mounted, upon which the work will automatically center itself by resting in the V-groove $a^2$ while being fed up against the cutters by an operator.

After numerous and various experiments I am convinced that no ordinary tools, drills, &c., can be made to do service upon such material as carbon with any degree of economy, as they will require constant care and attention to keep their cutting-edge within a required scale, and for such work as joining electric-light carbons by cutting them, as seen at F, Figs. 2 and 3, the expense of the necessary tools is a serious item to be considered. Cutting-tools for this purpose must be made quickly, else the expense of joining together the waste pieces of carbon will be as great or greater than their original cost when whole. Hence I cut with suitable dies the pieces D E from sheet-steel, each containing two or more of the cutters, as will be seen by reference to Figs. 2 and 3. The piece D has slots $d$, which form the plug $f$ upon a piece of carbon F, and cutting-edges $d'$, which form the shoulder $f'$ of said carbon, while the piece E is provided with projections $e$ for cutting a socket $f^2$ in a piece of carbon and the cutting-edges $e'$ face off the end of same, as at $f^3$. These edges $d\ d'\ e\ e'$ of the pieces D E are all brought to a cutting-edge by a file, as indicated by the double lines in Figs. 2 and 3.

A simple and convenient chuck which I use for these cutters consists of a stationary and detachable jaw or clamp, respectively G H, held together by means of an outer collar I, which may be rigidly secured to the former by a screw or pin and provided with a set-screw $i$, which will bear upon the latter. The inside diameter of the collar I equals the width between opposite cutters of the pieces D E, which are inserted between the jaws G H, and thus readily center themselves, the shoulder $g$ of the jaw G serving as a stop for the cutters. The larger or stationary jaw G is provided with a tapering spindle $g'$, which is forced into a socket in the end of the lathe-spindle B. Two hands may work at this lathe at the same time, one cutting the sockets at one end and the other turning the plugs of the carbons at the other end. When a cutter becomes dull, the lathe is stopped, the chuck opened, and the cutter turned around or reversed, and when all have been used until dull the piece D or E is removed and another inserted.

Having described my invention, what I claim as new is—

1. The combination of a chuck comprising two diametrically-divided jaws, an exterior ring or collar rigidly fixed to one of said jaws, and reversible cutters stamped by a die from sheet metal, the diameter of which equals the interior of said collar, and a set-screw threaded to said collar for clamping said cutter between the jaws.

2. The pieces D E, stamped from sheet metal, provided with two or more cutters arranged diametrically opposite, combined with a chuck divided diametrically and provided with an exterior collar and set-screw threaded therein for clamping the cutter between said jaws.

3 The pieces D E, stamped from sheet metal, provided with two or more cutters arranged diametrically opposite, combined with a chuck divided diametrically and provided with an exterior collar and set-screw threaded therein for clamping the cutter between said jaws, and a vertically-adjustable guide-rest having a V-groove therein formed horizontally and in line with the lathe-spindle for supporting and centering the carbons.

In testimony whereof I affix my signature in presence of two witnesses.

NATHAN P. STEVENS.

Witnesses:
J. B. THURSTON,
J. E. FERNALD.